(12) United States Patent
Notargiacomo et al.

(10) Patent No.: US 12,262,234 B2
(45) Date of Patent: *Mar. 25, 2025

(54) SYSTEM AND METHOD FOR SECURELY HOSTING MULTIPLE NETWORK OPERATORS IN A SHARED SPECTRUM ACCESS SYSTEM ON A SINGLE VIRTUAL BASE STATION ENVIRONMENT

(71) Applicant: John Mezzalingua Associates, LLC, Liverpool, NY (US)

(72) Inventors: Massimo Notargiacomo, Castel Bolognese (IT); Todd Landry, Grayslake, IL (US); Jeffrey Masters, Ashland, VA (US); Roberto Orlandini, Budrio (IT); Jeffrey Courington, Chester, VA (US); Francesco Foresta, Faenza (IT); Stephen Turner, Mechanicsville, VA (US); Alessandro Pagani, San Giovanni (IT); Domenico Di Iorio, Ravenna (IT); Kurt Jacobs, Lake Bluff, IL (US); Patrick Henkle, Homer Glen, IL (US); Vishal Agrawal, Vernon Hills, IL (US); Sasi Eswaravaka, Round Lake, IL (US); Paul Stath, Moseley, VA (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/133,423

(22) Filed: Apr. 11, 2023

(65) Prior Publication Data
US 2023/0247453 A1 Aug. 3, 2023

Related U.S. Application Data

(60) Division of application No. 17/375,712, filed on Jul. 14, 2021, now Pat. No. 11,758,423, which is a
(Continued)

(51) Int. Cl.
*H04L 12/28* (2006.01)
*H04W 8/18* (2009.01)
(Continued)

(52) U.S. Cl.
CPC ........... *H04W 24/08* (2013.01); *H04W 8/183* (2013.01); *H04W 12/06* (2013.01); *H04W 16/14* (2013.01);
(Continued)

(58) Field of Classification Search
CPC . H04W 16/14; H04W 28/16; H04W 72/0453; H04W 24/08; H04W 88/085
(Continued)

(56) References Cited

U.S. PATENT DOCUMENTS 8,060,058 B2 11/2011 Ch'ng et al.
8,165,528 B2 4/2012 Raghothaman et al.
(Continued)

FOREIGN PATENT DOCUMENTS

WO 2019067120 4/2019

OTHER PUBLICATIONS

Moorut, et al. "Signaling Protocols and Procedures for Citizens Broadband Radio Service (CBRS): Spectrum Access 1 System (SAS)—Citizens Broadband Radio Service Device (CBSD) Interface Technical Specification," SAS-CBSD TS WINNF-TS-0016, Version V1.2.4 Jun. 26, 2019.
(Continued)

*Primary Examiner* — John Pezzlo
(74) *Attorney, Agent, or Firm* — BRYAN CAVE LEIGHTON PAISNER LLP

(57) ABSTRACT

Disclosed is a virtual base station capable of hosting multiple network operators and/or private networks in a single compute environment. The virtual base station includes a plurality of virtual baseband processors configured to com-
(Continued)

municate with the plurality of mobile network operators, a supervisor module, a fronthaul network interface configured to be coupled to one or more remote units, and a KPI (Key Performance Indicator) coordinator module coupled to the supervisor module and the one or more virtual baseband processors. The base station may have on or more CBRS (Citizens Broadband Radio Service) Daemons to act as a proxy for obtaining grants to CBRS channels and allocating the CBRS channels to the mobile network operators.

18 Claims, 8 Drawing Sheets

Related U.S. Application Data continuation of application No. 16/935,026, filed on Jul. 21, 2020, now Pat. No. 11,096,075.

(60) Provisional application No. 62/950,377, filed on Dec. 19, 2019, provisional application No. 62/877,073, filed on Jul. 22, 2019.

(51) Int. Cl.
| | | |
|---|---|---|
| *H04W 12/06* | (2021.01) | |
| *H04W 16/14* | (2009.01) | |
| *H04W 24/02* | (2009.01) | |
| *H04W 24/08* | (2009.01) | |
| *H04W 48/18* | (2009.01) | |
| *H04W 88/08* | (2009.01) | |
| *H04W 88/10* | (2009.01) | |

(52) U.S. Cl.
CPC ........... *H04W 24/02* (2013.01); *H04W 48/18* (2013.01); *H04W 88/08* (2013.01); *H04W 88/085* (2013.01); *H04W 88/10* (2013.01)

(58) Field of Classification Search
USPC ........................................ 370/252, 329, 430
See application file for complete search history.

(56) References Cited

U.S. PATENT DOCUMENTS

| | | |
|---|---|---|
| 8,452,299 B2 | 5/2013 | Raghothaman |
| 9,380,466 B2 | 6/2016 | Eyuboglu et al. |
| 9,414,399 B2 | 8/2016 | Eyuboglu et al. |
| 10,057,916 B2 | 8/2018 | Barabell et al. |
| 10,244,472 B2 | 3/2019 | Fazel Sarjoui et al. |
| 10,405,344 B2 | 9/2019 | Shanmugaraju et al. |
| 10,461,825 B2 | 10/2019 | Sandberg et al. |
| 2016/0095018 A1* | 3/2016 | Vajapeyam ........... H04W 16/14 370/331 |
| 2017/0126458 A1 | 5/2017 | Shattil ................. H04L 27/2615 |
| 2017/0175411 A1 | 6/2017 | Bowers ................. G08B 13/00 |
| 2018/0063844 A1 | 3/2018 | Khoshnevisan et al. |
| 2018/0115347 A1* | 4/2018 | Yerramalli .......... H04W 74/004 |
| 2018/0115652 A1 | 4/2018 | Russell et al. |
| 2018/0115908 A1 | 4/2018 | Wang et al. |
| 2018/0359660 A1* | 12/2018 | Konappa ............... H04W 36/08 |
| 2019/0028182 A1* | 1/2019 | Smyth ................... H04W 24/08 |
| 2019/0141713 A1 | 5/2019 | Cimpu et al. |
| 2019/0215058 A1* | 7/2019 | Smyth ................ H04B 7/18502 |
| 2019/0254047 A1* | 8/2019 | Ahmed ............... H04W 88/085 |
| 2020/0162941 A1 | 5/2020 | Bapat et al. |
| 2020/0245344 A1 | 7/2020 | Krishnaswamy et al. |
| 2020/0296799 A1 | 9/2020 | Barabell et al. |
| 2020/0305159 A1 | 9/2020 | Raghothaman ....... H04W 88/08 |
| 2020/0359224 A1* | 11/2020 | Gibson ................. H04W 16/02 |
| 2020/0367062 A1 | 11/2020 | Salahuddeen et al. |
| 2020/0404607 A1 | 12/2020 | Charipadi |
| 2021/0007039 A1 | 1/2021 | Salahuddeen et al. |

OTHER PUBLICATIONS

Winnf-TS-0061 Version V1.4.1, "Test and Certification for Citizens Broadband Radio Service (CBRS); Conformance and Performance Test Technical Specification; SAS as Unit Under Test (UUT)," Dec. 21, 2018 (171 Pages).

Marko Palola et al., "Field Trial of the 3.5 GHz Citizens Broadband Radio Service Governed by a Spectrum Access System (SAS)" 2017 IEEE International Symposium on Dynamic Spectrum Access Networks (DySPAN) May 8, 2017 (22 Pages).

* cited by examiner

SYSTEM AND METHOD FOR SECURELY HOSTING MULTIPLE NETWORK OPERATORS IN A SHARED SPECTRUM ACCESS SYSTEM ON A SINGLE VIRTUAL BASE STATION ENVIRONMENT

This application is a divisional application of U.S. patent application Ser. No. 17/375,712 filed Jul. 14, 2021, which is a continuation application of U.S. patent application Ser. No. 16/935,026 filed Jul. 21, 2020, now U.S. Pat. No. 11,096,075, which claims priority to U.S. Provisional Application Nos. 62/877,073 filed Jul. 22, 2019 and 62/950,377 filed Dec. 19, 2019, all of which are hereby incorporated by reference in their entireties as if fully set forth herein.

BACKGROUND OF THE DISCLOSURE

Field of the Disclosure

The present disclosure relates to wireless systems, and more particularly, to virtual base stations that can host multiple operators in the same compute environment, as might be deployed by neutral hosts.

Related Art

The advent of pure software-implemented virtual base stations has offered the opportunity to host multiple network operators on a single wireless communication infrastructure. Hosting multiple network operators in a single compute environment offers certain challenges. First, the compute environment must be sufficiently secure so that a given network operator is not vulnerable to hacking or denial of service. Second, the entire base station, from the compute environment hosting the virtual eNodeBs (Evolved Node Bs) and/or gNodeBs (next generation Node Bs) through to the remote radio units, must not suffer from interference or bottlenecking whereby a surge of activity within one network operator might impact the compute, network, or radio resources allocated to another network operator. Third, a neutral host operating the virtual base station must be able to assess the performance of the system in order to provide appropriate service to each network operator and be able to do so in such a way that no single network operator is impacted by the presence of another. Fourth, the advent of private networks and shared spectrum access systems provides additional challenges in that the base station and compute environment must be able to cope with the granting, grant revocation, and channel switching scenarios whereby a given network operator or private network can change shared spectrum access channels without impacting any of the other network operators or private networks.

Accordingly, what is needed is a system and method for hosting multiple eNodeBs/gNodeBs, one for each network operator or private network, in a secure environment that provides unimpeded access to compute, network, and radio resources, to multiple network operators and can dynamically respond to changes in available shared spectrum access channels.

SUMMARY OF THE DISCLOSURE

An aspect of the present disclosure involves a method for configuring and operating a virtual base station that hosts multiple network operators. The method comprises instantiating a plurality of baseband processors, each baseband processor corresponding to one of a plurality of network operators, each baseband processor having one or more cell group processors, wherein each cell group processor has a plurality of band-specific cell processors; allocating a distinct plurality of shared spectrum access channels to each of the plurality of baseband processors; receiving a grant to one or more of the distinct plurality of shared spectrum channels corresponding to each baseband processor; and assigning each shared spectrum access channel of the distinct plurality of shared spectrum access channels for each of the plurality of baseband processors to a corresponding band-specific cell processor of each.

Another aspect of the present disclosure involves a non-transitory computer readable memory encoded with instructions which, when executed by one or more processors, cause the one or more processors to implement a process for configuring and operating a virtual base station that hosts multiple network operators. The process comprises instantiating a plurality of baseband processors, each baseband processor corresponding to one of the multiple network operators, each baseband processor having one or more cell group processors, wherein each cell group processor has a plurality of band-specific cell processors; allocating a distinct plurality of shared spectrum access channels to each of the plurality of baseband processors; receiving a grant to one or more of the distinct plurality of shared spectrum channels corresponding to each baseband processor; assigning each shared spectrum access channel of the distinct plurality of shared spectrum access channels for each of the plurality of baseband processors to a corresponding band-specific cell processor of each.

Another aspect of the present disclosure involves a server. The server has at least one network interface configured to communicate with a plurality of core networks and a plurality of remote units. The server also has at least one processor. The server also has a non-transitory computer readable memory encoded with instructions which, when executed by the at least one processor, cause the at least one processor to implement a process. The process includes routing, via the at least one network interface, first communication between a first core network and the remote units, wherein the first communication utilizes a first set of communication channels allocated to the first core network. The process also includes routing, via the at least one network interface, second communication between a second core network and the remote units, wherein the second communication utilizes a second set of communication channels allocated to the second core network. The process also includes receiving, via the at least one network interface, a message that changes the first set of communication channels, and changing the first set of communication channels, in accordance with the message.

Another aspect of the present disclosure involves a method for hosting multiple network operators in a single compute environment. The method comprises allocating an operator-specific plurality of shared spectrum access channels to each of a plurality of baseband processors, each of the baseband processors corresponding to one of the multiple network operators, the operator-specific plurality of shared spectrum access channels having a request subset of shared spectrum access channels and a reserve subset of shared spectrum access channels; requesting, by each baseband processor, an access grant for its corresponding request subset of shared spectrum access channels; receiving a reply access grant for each request subset of shared spectrum access channels; receiving, by a first baseband processor, a grant revocation corresponding to a revoked shared spectrum access channel within one of the request subset of shared spectrum access channels; and requesting, by the first baseband processor, an access grant for one of its corresponding reserve subset of shared spectrum access channels.

DESCRIPTION OF EXEMPLARY EMBODIMENTS

Figure 1A:
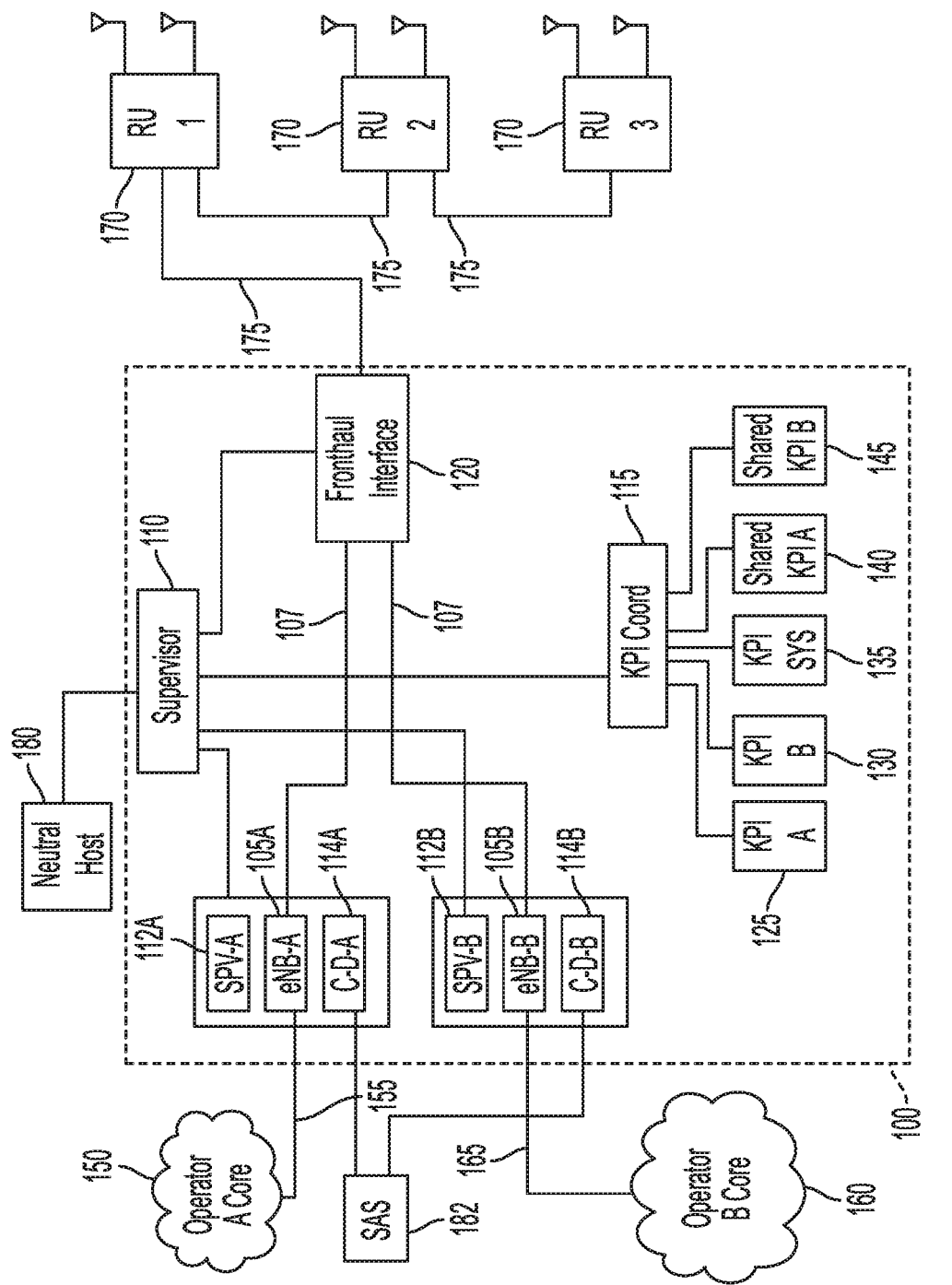
FIG. 1A illustrates an exemplary virtual base station for hosting multiple network operators according to the disclosure.

FIG. 1A illustrates an exemplary virtual base station 100 (hereinafter base station 100) for hosting multiple network operators according to the disclosure. The base station 100 is a virtual base station which is software-implemented in a compute environment. The compute environment has hardware components including one or more processors and a non-transitory computer readable memory, and when configured with appropriate software the hardware components operate to implement base station 100. In some implementations, the software is stored in the non-transitory computer readable memory of the compute environment. In other implementations, the software is stored elsewhere, but executed in the compute environment, for example through an API (Application Programing Interface) provided by the compute environment.

In this example, base station 100 hosts two mobile network operators (A and B) that share a remote radio infrastructure. As used herein, the term "mobile network operator" may also include a private network, wherein the primary difference is that a private network will not have licensed spectrum but will instead rely on a shared spectrum access system. Base station 100 may have one or more virtual baseband processors 105A/B; a local supervisor module 112A coupled to baseband processor 105A; a CBRS-Daemon 114A coupled to baseband processor 105A; a local supervisor module 112B coupled to baseband processor 105B; a CBRS-Daemon 114B coupled to baseband processor 105B; a master supervisor module 110; a KPI (Key Performance Indicator) coordinator module 115; and a fronthaul network interface 120 (also referred to herein as "fronthaul interface 120"). Coupled to KPI coordinator module 115 are a KPI processing module 125 for mobile network operator A; a KPI processing module 130 for mobile network operator B; a KPI processing module 135 for the system; a shared KPI processing module 140 corresponding to mobile network operator A that may be shared with the other components within virtual base station 100; and a shared KPI processing module 145 corresponding to mobile network operator B that may be shared with the other components within virtual base station 100. As illustrated, baseband processor 105A communicates with the mobile network operator A's core network 150 via a dedicated S1 connection 155; and baseband processor 105B communicates with the mobile network operator B's core network 160 via a dedicated S1 interface 165. Base station 100 is further coupled to one or more remote units 170 via a fronthaul link 175.

In some implementations, as illustrated, each virtual baseband processor 105A/B is an LTE (Long-Term Evolution) eNodeB. However, other virtual baseband processors are possible, such as 5G NR (New Radio) gNodeB, for example. As used herein, the term virtual "baseband processor" may refer to a virtual eNodeB, or a virtual gNodeB. In the case of a gNodeB, the term "baseband processor" may refer to a gNodeB CA (Central Unit), a gNodeB DU (Distributed Unit), or a combination gNodeB CU+DU. It will be understood that such variations are possible and within the scope of the disclosure. In the case of a baseband processor being an eNodeB or a gNodeB CU+DU combination, each may have perform the upper PHY (Physical Layer) layer functions of a PHY split scheme, such as the 7-2× split specified by the 0-RAN (Open Access Radio Network) Alliance.

Each CBRS-Daemon 114A/B may be coupled to a CBRS SAS (Spectrum Allocation System) 182 over an internet connection. Each CBRS-Daemon 114A/B may operate independently and each may be coupled to a single SAS or each to a different SAS. Alternatively, base station 100 may have a single CBRS-Daemon that serves all of the baseband processors 105A/B. It will be understood that such variations are possible and within the scope of the disclosure.

Fronthaul network interface 120 may include, for example a CPRI (Common Public Radio Interface) that may be implemented on a PCIe (Peripheral Component Interconnect Express) board. Alternatively, depending on the architecture of base station 100, fronthaul link 175 may be an Ethernet connection. In this case, communication between the fronthaul interface 120 and the remote units 170 may be a packet-based eCPRI (enhanced Common Public Radio Interface) connection, which may carry packetized eCPRI data representing TD (time domain) or FD (frequency domain) baseband signals between fronthaul interface 120 and the remotes; high-low PHY layer split data (e.g., as specified by 0-RAN as the 7-2× split); or F1 interface data (in the case that each "eNodeB" 105A/B is a gNodeB CU and each remote unit 170 has gNodeB DU functionality. It will be understood that various implementations of a fronthaul link 175 and fronthaul interface 120 are possible and within the scope of the disclosure.

Master supervisor module 110 sets up and configures the components within base station 100 with the intent that the eNodeBs of other network operators do not impair the function of each baseband processor 105A/B or cause insufficient performance as measured by the KPIs of each mobile network operator. As illustrated, master supervisor module 110 is coupled to each baseband processor 105A/B (via its respective local supervisor module 112A/B), KPI coordinator 115, and fronthaul network interface 120. Master supervisor module 110 may further communicate with neutral host 180 that operates base station 100 over an internet connection. The communication between master supervisor module 110 and neutral host 180 may take the form of a user interface or similar. Further, master supervisor module 110 may grant neutral host 180 access to system KPI module 135 and the respective shared KPI modules 140/145 of mobile network operator A/B. Depending on how base station 100 is configured, master supervisor module 110 may or may not have access to the respective KPI processing modules 125/130 of mobile network operator A/B.

Master supervisor module 110 may also have internet connectivity to the mobile network operator A/B's respective core networks 150/160. This may facilitate the communication of configuration information, such as carrier and CBRS channel information, as well as KPI information via KPI coordinator 115. Otherwise, or in addition, KPI modules 125/130 may communicate KPI information directly to their respective mobile network operator core networks 150/160 via their respective baseband processors 105A/B. It will be understood that such variations are possible and within the scope of the disclosure.

Each of the baseband processors 105A/B may include software modules that execute the RRC (Radio Resource Control), PDCP (Packet Data Convergence Protocol), RLC (Radio Link Control), MAC (Medium Access Control), and PHY components of an LTE or 5G protocol stack for both the control planes and data planes. By employing container technology, the master supervisor module 110 may (in conjunction with the operating system of the compute environment of base station 100) instantiate and de-instantiate each baseband processor 105A/B independently of each other. Master supervisor module 110 may instantiate each local supervisor module 112A/B, which may in turn configure and operate its corresponding baseband processor 105A/B (described further below). Each baseband processor 105A/B is respectively coupled to fronthaul network interface 120 via a bidirectional digital BB (baseband) I/Q (in-phase/quadrature) data connection 107. In the case of a DL (download) signal, the BB I/Q data on the data connection 107 is a digital representation of the BB signal that is subsequently merged (e.g., each allocated to a CPRI Antenna Carrier) into a CPRI signal by the fronthaul network interface 120 and transmitted to each remote unit 170. Each remote unit 170 retrieves the intended signal from the CPRI data stream, upconverts the signal to an analog RF (Radio Frequency) signal and amplifies it for transmission over the antennas corresponding to the remote unit 170. In the case of a UL (uplink) signal, the BB I/Q data on the data connection 107 is a digital representation of the downconverted RF signal detected by the antennas of one or more remote unit 170, which amplifies and digitizes the signal, formats the signal according to the CPRI specification, and transmits it to the fronthaul network interface 120. The fronthaul network interface 120 then identifies and extracts the BB I/Q data corresponding to the carriers allocated to the baseband processor 105A/B and relays it to the appropriate eNodeB over data connection 107.

Figure 1B:
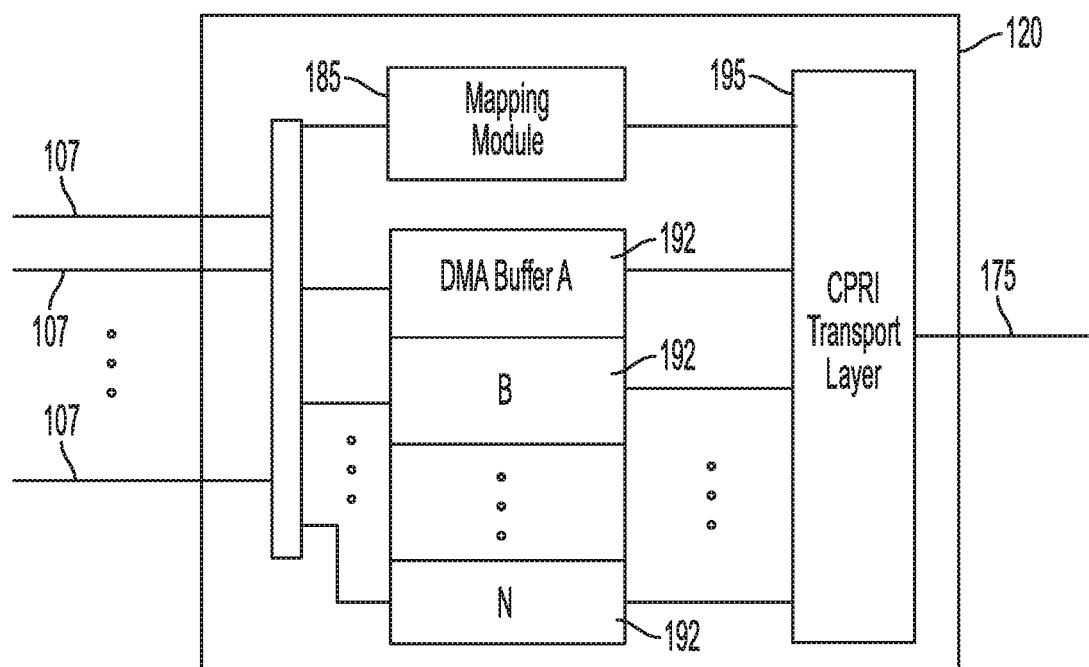
FIG. 1B illustrates a fronthaul interface mapping module according to the disclosure.

FIG. 1B illustrates an exemplary fronthaul network interface 120 that includes a mapping module 185 that overlays a CPRI transport layer 195. The mapping module 185 serves as a coordinator between the baseband processors 105A/B and the CPRI transport layer 195, enabling different baseband processors 105A/B to operate independently without affecting any other baseband processors. This can be particularly important in that one network operator's baseband processor may be restarted, configured, or reconfigured (e.g., individual cells locked or activated) without affecting the operations of the other network operator. It also enables base station 100 to dynamically instantiate and add—or remove and deinstantiate—additional baseband processors.

The mapping module 185 within the fronthaul network interface 120 may do this by mapping the samples of a given baseband processor 105A/B (via their respective bidirectional digital baseband I/Q data connections 107 to an allocated DMA (Direct Memory Access) buffer 192, and mapping the allocated DMA buffer 192 to a certain sample range within a given CPRI block in CPRI transport layer 195. A CPRI connection is synchronous whereby it transmits a fixed amount of data at a fixed amount of time. A CPRI transport block is of a fixed size, according to the bandwidth of the CPRI link (fronthaul link 175), which keeps the CPRI link at 100% utilization at all times. The mapping module 185 maps the samples corresponding to each baseband processor 105A/B to certain portions of each CPRI block. For example, the mapping module 185 may allocate to baseband processor 105A the first bandwidth portion (e.g., 1.4, 3, 5, 10, 15, or 20 MHz, given how many component carrier(s) correspond to the baseband processor 105A/B) of the CPRI block for its data. Even though a portion of the CPRI block may be empty, the entire block will be transmitted by the fronthaul network interface 120 (with padding over the unused portion) at the appropriate timing interval. Mapping module 185 may assign baseband processor 105B to a second bandwidth allocation (e.g., one of the bandwidths enumerated above for the corresponding component carriers of the other baseband processor 105A/B) via a second DMA buffer 192 to a second portion of the CPRI block. Mapping module 185 may do so such that the CPRI blocks are used contiguously, as each eNodeB's allocated CPRI blocks are appended to the CPRI blocks of the preceding eNodeB's CPRI blocks. The mapping module 185 may similarly further accommodate additional eNodeBs. For example, master supervisor module 110 may instantiate two additional baseband processors 105C/D (not shown) and configure the fronthaul interface module 120 for the two new baseband processors 105C/D and their respective bandwidth requirements. Given the available space within the CPRI block and the bandwidth requirements of each additional baseband processor 105C/D, the mapping module may allocate the remaining bandwidth of the CPRI block to baseband processor 105C and baseband processor 105D, via additional DMA buffers 192, which may result in filling the CPRI block. This would require that the mapping module allocate new DMA buffers 192, one per new baseband processor 105C/D and map the new DMA buffers 192 to the allocated slots within the CPRI block in CPRI transport layer 195. Then, for example, depending on fluctuations in demand for connectivity, master supervisor module 110 may shut down baseband processor 105B and baseband processor 105D, instructing the fronthaul network interface 120 (and thus the mapping module 185) to remove these two baseband processors from the CPRI block. Accordingly, the mapping module 185 may do so, disconnecting the corresponding DMA buffers 192 from the terminated baseband processors 105B/D, leaving their corresponding portions of the CPRI block unused, whereby fronthaul interface module 120 may pad the unused data portions.

If a given baseband processor locks or otherwise shuts down a cell, or if the master supervisor module 110 shuts down a given baseband processor, then the CPRI blocks allocated to that cell or entire baseband processor may become available for the mapping module 185 to reallocate. For example, if a given baseband processor has locked or shut down a cell, mapping module 185 may reallocate the newly freed CPRI block to either the same baseband processor or another baseband processor looking to activate a new cell. Alternatively, mapping module 185 may allocate the newly freed CPRI block to a new baseband processor.

Each baseband processor 105A/B may asynchronously load and extract data from its corresponding DMA buffers 192. The DMA buffers 192 may handle the synchronization in loading/extracting data to/from the CPRI transport layer 195.

The CPRI data may be in either time domain I/Q or frequency domain I/Q format.

An advantage of the mapping module 185 is that it enables the removal and adding of baseband processors without interrupting the operation of the other existing running baseband processors.

KPI coordinator module 115 configures and maintains KPI modules 125/130/135/140/145 according to configuration information provided by master supervisor module 110. KPI coordinator module 115 may control access to each of these KPI modules, for example, so that mobile network operator A may only have access to KPI modules 125/140/145, mobile network operator B may only have access to KPI modules 130/140/145, and master supervisor module 110 may only have access to KPI modules 135/140/145. In an alternate example, master supervisor module 110 may have access to all of the KPI modules 125/130/135/140/145. KPI coordinator 115 may intercept or extract relevant data from each baseband processor 105A/B, or each KPI module may be directly coupled directly to its corresponding baseband processor 105A/B. For example, KPI module 125 may be directly coupled to baseband processor 105A, which, being purely virtual and implemented in software, may be configured to be instrumented such that relevant KPIs, or their underlying data, may be accessed directly by KPI module 125. It will be understood that such variations are possible and within the scope of the disclosure.

KPI modules 125/130 may include proprietary code provided by mobile network operator A/B and hosted as an agent in the compute environment of base station 100. Each of the KPI modules 125/130 may intercept or extract data from the fronthaul interface 120 and use the data to measure its intended KPIs. All or some of the specific algorithms and implementations of one mobile network operator's KPI extraction and analysis may be hidden to neutral host 180 and the other mobile network operators. Further, KPI modules 125/130 may be integrated into respective baseband processors 105A/B. KPI modules 125/130 may respectively provide data to shared KPI processing modules 140/145, which can in turn provide reports or generate alarms to KPI coordinator 115. Further, master supervisor module 110 may grant neutral host 180 access to system KPI module 135 and the respective shared KPI modules 140/145 of mobile network operator A/B. An example of this may be a situation in which KPI module 125 of mobile network A, using its proprietary KPI data and analytics, identifies an anomaly within a hardware component (e.g., an amplifier) within a given remote unit 170 and issues an alarm to neutral host 180 via KPI coordinator 115. Accordingly, examples of shared KPIs may include hardware anomalies within the remotes 170 or in the fronthaul link 175. In the event that a KPI module 125/130 measures a KPI or identifies an anomaly that it is configured to share with the system 100, it may store this information in its respective shared KPI module 140/145 so that it is available to the KPI coordinator 115. Examples of KPIs include those defined by 3GPP (3rd Generation Partnership Project) in TS 32.450, such as ERAB (Evolved UTRAN (Universal Terrestrial Radio Access Network) Radio Access Bearer) Accessibility, ERAB Retainability, IP (Internet Protocol) Throughput, IP Latency, Cell Availability, and Mobility, as well as proprietary KPIs.

KPI modules 125/130 may generate alarms that are proprietary to mobile network operator A/B as well as generate and provide KPI data and reports that it may send to mobile network operator A/B at a regular interval (e.g., every 15 minutes) via a northbound interface (not shown). In an example, KPI modules 125/130 may simply extract and compile proprietary data for mobile network operators A/B to process within their respective core networks 150/160 and perform no or minimal embedded analytics within base station 100. It will be understood that such variations are possible and within the scope of the disclosure.

System KPI processing module 135 may extract or receive data from each remote unit 170 regarding its health. Accordingly, each remote unit 170 and fronthaul network interface 120 may be instrumented with embedded sensors and software components that monitor the function of the components and report anomalies to system KPI processing module 135. Further, system KPI processing module 135 may compile data regarding the function of the compute environment hosting base station 10, such as the mean and peak processing load for each thread corresponding to the software modules described herein.

The remote units 170 may include, for example, one or more conventional macro remotes, one or more small cells, one or more DAS (Distributed Antenna Systems), and/or one or more TEKO™ Cell Hubs offered by JMA Wireless™. If the fronthaul link 175 is a CPRI link, then the remote units 170, regardless of their specific type, may have onboard processing such as (for DL, not in order), DAC (Digital to Analog Converter), upconversion to a specified RF carrier frequency, signal combining from multiple CPRI Antenna Carriers into a single RF signal, and power amplification. For the UL, each remote unit 170 may include low noise amplification, filtering, downconversion to baseband, ADC (Analog to Digital Converter), and potentially a summing function that may sum the given CPRI Antenna Carrier data with those of other remote units 170. In a variation in which fronthaul link 175 carries packetized time domain or frequency domain data using an eCPRI connection, each remote unit 170 may have circuitry and/or processing capability to de-packetize the DL data stream into a digital stream which it may subsequently process into an analog RF signal, and to packetize the received digitized UL signals for transport to the appropriate baseband processor 105A/B. In a variation in which the baseband processors 105A/B operate using a PHY layer split (such as the 7-2× O-RAN split), then each remote unit 170 may have the appropriate circuitry and/or processing capability to perform the lower PHY layer functionality. In a variation in which one or more of the baseband processors 105A/B function as gNodeB CUs, then each remote unit 170 may have the appropriate circuitry and/or processing capability to perform 5G DU functionality. In a further variation in which fronthaul link 175 is an Ethernet connection, each remote unit 170 may have the capability of performing any combination of TD/FD eCPRI, 7-2× split, and 5G DU processing. It will be understood that such variations are possible and within the scope of the disclosure.

Remote units 170 may be arranged in a daisy chain configuration, as illustrated in FIG. 1A, or may be arranged in a hub and spoke configuration, or a combination thereof.

Remote units 170 may be dispersed throughout a large venue, such as a university campus or stadium, such that the risk of mutual interference is minimal. Further to this variation, the remote units 170 may be located such that any given remote unit 170 may experience the vast majority of traffic at any given time. In the example of a stadium, the first remote unit 170 (RU 1) may be deployed in a parking lot; the second remote unit 170 (RU 2) may be deployed in a stadium bowl; and the third remote unit 170 (RU 3) may be deployed in a concourse. At any given time during the course of an event, the majority of UE (User Equipment) traffic may be either in the parking lot, the concourse, the bowl, the concourse again, and the parking lot again. In this case, it may be advantageous to treat all three remote units 170 as being one cell, wherein they share a CPRI Antenna Carrier. In this example a single virtual baseband processor 105A may transmit DL data in a single CPRI Antenna Carrier to all three remote units 170 in a multicast mode. The scheduler within baseband processor 105A would thereby allocate a distinct set of REs (Resource Elements) to each UE within coverage of any one of the remote units 170, and each remote unit 170 would receive the same DL CPRI Antenna Carrier. In the UL, however, each remote unit 170 will not be receiving the same signals because each remote unit 170 will be receiving UL signals from a distinct subset of UEs. In this case, given the daisy chain configuration and that each UE is allocated a unique set of REs, each remote unit 170 may sum its own CPRI Antenna Carrier data with that of its preceding remote unit 170. For example, RU 2 may sum its UL CPRI Antenna Carrier data with that of RU 1, and RU 3 may sum its UL CPRI Antenna Carrier data with the summed CPRI Antenna Carrier data from RU 2. Various implementations for summing are possible and within the scope of the disclosure. For example, a simple summation of the time domain signals (e.g., all of the frequency bins within a given subframe for a single TTI (transmit time interval)) may be done in deployments in which high signal to noise levels are expected, such as an indoor deployment. Further, interference containment algorithms may be used to ensure a reliable uplink channel in the presence of high co-channel activity.

The above exemplary embodiment is one in which fronthaul link 175 is a CPRI link and BB time domain data is communicated between base station 100 and remote units 170. In another variation, the remote units 170 may perform low level PHY functionality that would otherwise be done by the baseband processors 105A/B. In this example of a PHY layer split, the fronthaul link 175 may be considered a mid-haul link, and as used herein, the term "fronthaul link" may also refer to a mid-haul link. For example, the PHY layer split may be done according to the "7.2 split" as described in 3GPP TR 38.816 v1.0.0, although other proposed PHY layer split schemes are possible, depending on the available bandwidth for fronthaul link 175. In this example in which the 7.2 split is used, the data communicated over fronthaul link 175 may be packetized data representing frequency domain data streams of PUCCH (Physical Uplink Control Channel), PUSCH (Physical Uplink Shared Channel), PDCCH (Physical Downlink Control Channel), and PDSCH (Physical Downlink Shared Channel) data for each UE connected to the remote units 170, and the fronthaul network interface 120 may be an Ethernet interface and/or router. Further to this example, the remote units 170 in the illustrated daisy chain configuration may sum the UL data it receives with that of the preceding remote unit 170 as described above. There may be advantages in this example due to the fact that the summation would be done in the frequency domain. It will be understood that such variations are possible and within the scope of the disclosure.

In a variation to virtual base station 100, virtual baseband processors 105A/B may be gNodeB CUs, whereby the DUs may be embedded within the remote units 170. In this case, data connections 107, fronthaul network interface 120, and fronthaul link 175 may implement an F1 interface over Ethernet. It will be understood that such variations are possible and within the scope of the disclosure.

Figure 1C:
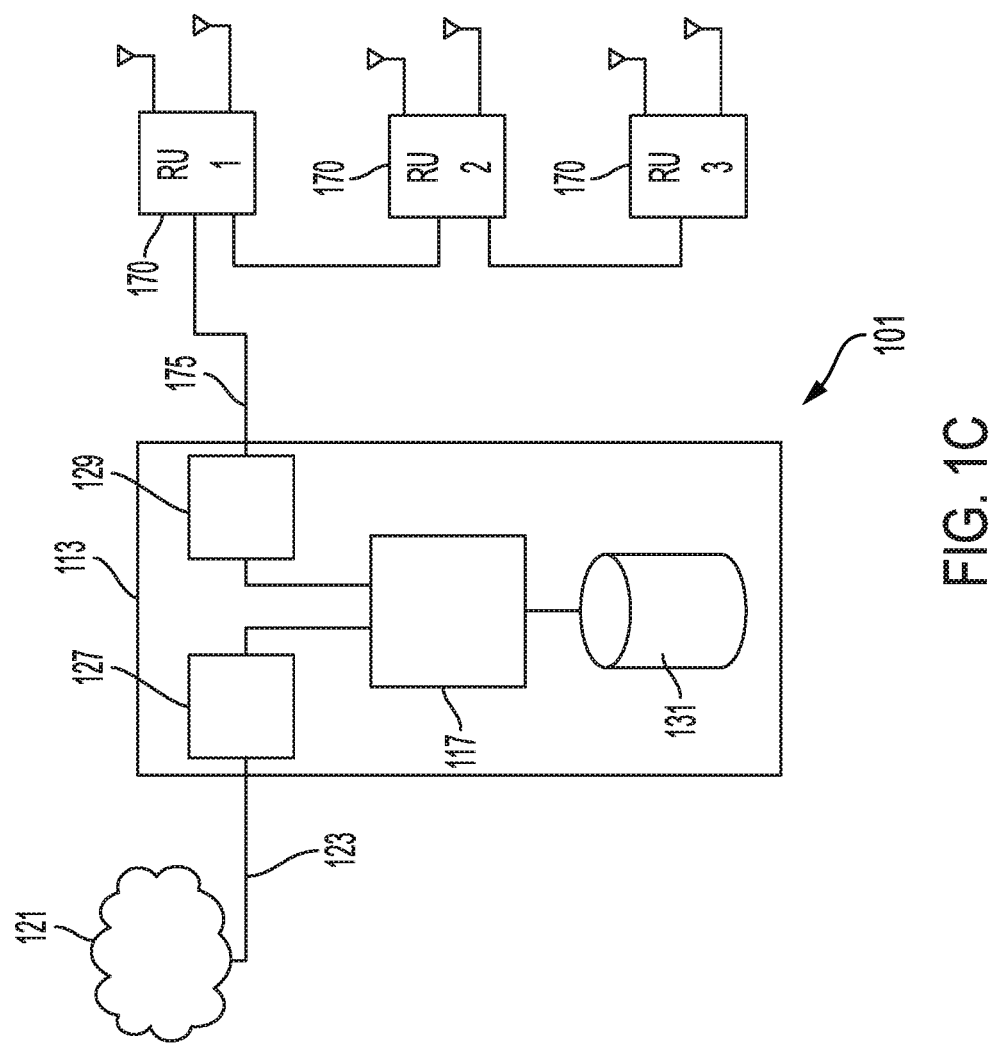
FIG. 1C illustrates an exemplary compute environment in which the disclosed virtual base station may be deployed.

FIG. 1C illustrates an exemplary compute environment 101 in which base station 100 may be deployed. Compute environment 101 includes a server 113, which may comprise one or more rack servers or blade servers, each of which may have multiple processor cores. Server 113 has one or more processor cores 117, which are coupled to one or more storage devices 131. Server 113 is coupled to the internet 121 via an internet connection 123 and a server network interface 127. Server 113 may also have a fronthaul network interface card 129. If the fronthaul is implemented under the CPRI specification, then fronthaul network interface card 129 may be a PCIe board having circuitry that converts digital signal data to/from a CPRI format for transport over fronthaul link 175. Server 113 may further have hardware accelerator components, such as FPGAs (Field Programmable Gate Arrays) that are deployed on standard computer interface cards and programmed using well known IP (Intellectual Property) blocks to execute specific high speed computation for signal processing, as may be required.

Although the illustrated example shows server 113 having two separate network interfaces 127 and 129, it will be understood that other implementations are possible. In another implementation, one single network interface is provided for communicating with both the internet 121 and the remote units 170. More generally, server 113 has at least one network interface or communicating with the internet 121 and the remote units 170. Server 113 can communicate with core networks through the internet 121. Hence, server 113 can route communication between the core networks and the remote units as described herein. Such routing can include bidirectional communication or unidirectional communication. As described herein, routing of communication from a core network to the remote units can include multicast communication.

Figure 2:
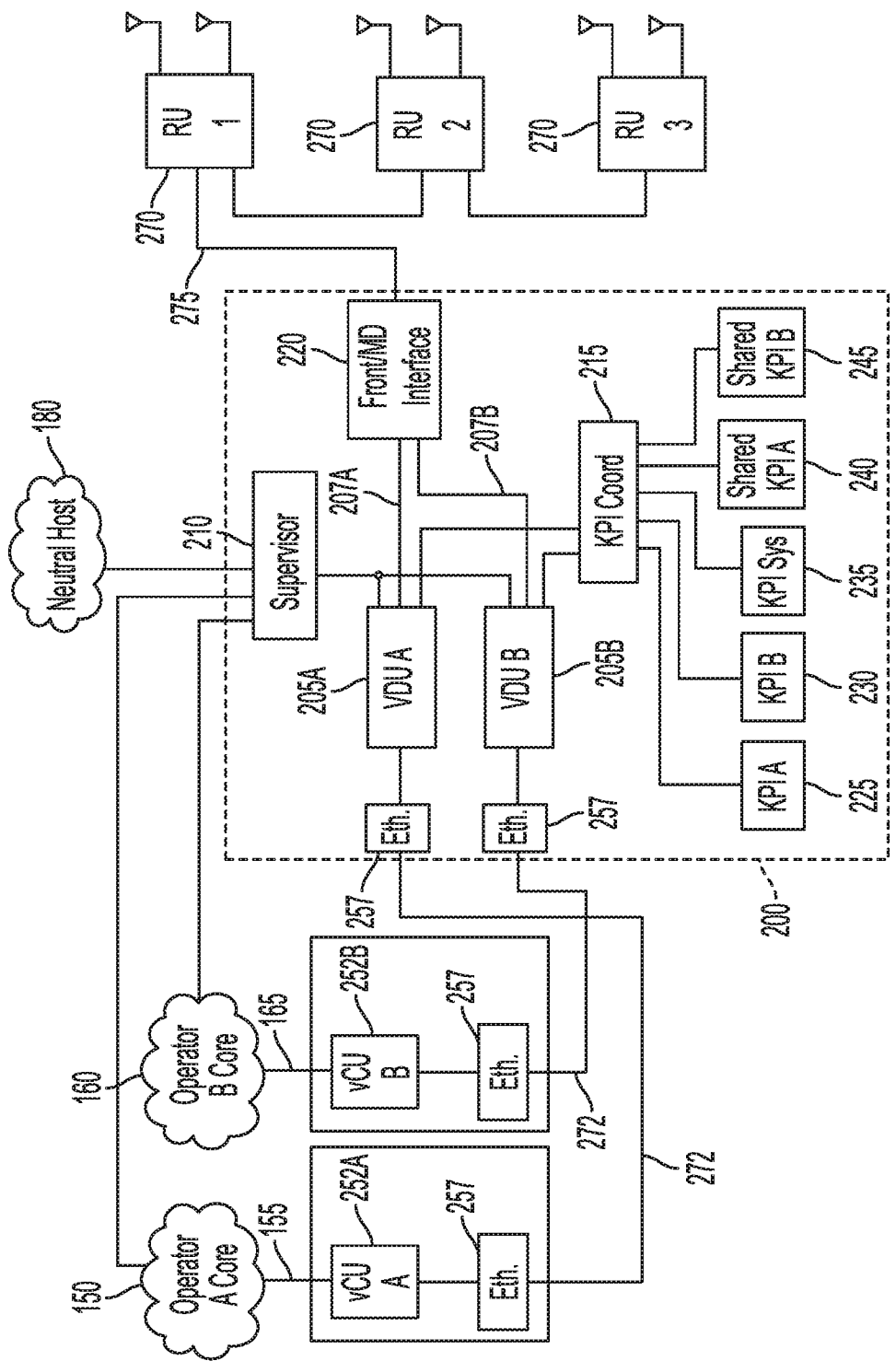
FIG. 2 illustrates an exemplary 5G (Fifth Generation) virtual base station configured to host multiple network operators according to the disclosure.

FIG. 2 illustrates a second exemplary virtual base station 200 (hereinafter base station 200) according to the disclosure. The base station 200 is a virtual base station which is software-implemented in a compute environment, for example the compute environment 101 shown in FIG. 1C. The compute environment has hardware components including one or more processors and a non-transitory computer readable memory, and when configured with appropriate software the hardware components operate to implement base station 200. In some implementations, the software is stored in the non-transitory computer readable memory of the compute environment. In other implementations, the software is stored elsewhere, but executed in the compute environment, for example through an API provided by the compute environment.

Base station 200 includes a master supervisor module 210; one or more DUs 205 (illustrated here as two DUs 205A/B, one per mobile network operator); and a KPI coordinator module 215. Coupled to KPI coordinator module 215 is a KPI processing module 225 for mobile network operator A; a KPI processing module 230 for mobile network operator B; a system KPI processing module 235; a KPI processing module 240 corresponding to mobile network operator A that may be shared with the other components within virtual base station 200; and a KPI processing module 245 corresponding to mobile network operator B that may be shared with the other components within virtual base station 200. Although not shown, base station 200 may have local supervisor modules corresponding to the DUs 205A/B, and CBRS-Daemon modules coupled to the CUs 252A/B, similar to those of base station 100.

A difference between base station 200 and base station 100 is that there is a CU/DU (Central Unit/Distributed Unit) split within each virtual gNodeB, and that the virtual CUs 252A/B may be respectively hosted on compute infrastructure that belongs to mobile network operator or private network A and B. In other words, CUs 252A/B may be deployed within the respective core network 150/160 of mobile network operator or private network A and B. Accordingly, CU 252A is coupled to DU 205A, which is hosted in the compute environment of base station 200, via F1 interface 272. Similarly, CU 252B is coupled to DU 205B, which is hosted in the compute environment of base station 200 via its own F1 interface 272. The F1 interfaces 272 may be implemented via an Ethernet connection established by Ethernet interfaces 257. Each DU 205A/B may include a mix of pure software implementation that is executed on conventional processor hardware and special-purpose hardware, such as FPGAs and other hardware accelerators.

Base station 200 is coupled to one or more remote units 270 via fronthaul link 275 and fronthaul network interface 220. Fronthaul network interface 220 may be substantially similar to fronthaul network interface 120 as described above, including the CPRI implementation as well as the Ethernet-based "7.2 split" variation. Fronthaul link 275 may include a CPRI link or an Ethernet link, depending on the fronthaul architecture, as is discussed above with regard to base station 100. The possible variations fronthaul implementation (e.g., CPRI, TD eCPRI, FD eCPRI, and 7-2×) and the example daisy chain configuration for remotes 270, including summing for the uplink Antenna Carriers, apply to the base station 200 as well as to base station 100.

The remote units 270 may include, for example, one or more conventional macro remotes, one or more small cells, one or more DAS, and/or one or more TEKO Cell Hubs offered by JMA Wireless. In a variation, the remotes 270 may each have embedded low PHY layer processing, in which case the fronthaul link 275 may instead be a mid-haul link, and the DUs 205A/B perform the upper PHY layer processing. The specific partitioning of the PHY layer may vary. As previously mentioned, it will be understood that such variations are possible and within the scope of the disclosure Master supervisor module 210 sets up and configures the components within base station 200 with the intent that nothing within the base station 200 impairs the function of each DU 205A/B or causes insufficient performance as measured by the KPIs of each mobile network operator. As illustrated, master supervisor module 210 is coupled to each DU 205A/B, KPI coordinator 215, and fronthaul network interface 220. Master supervisor module 210 may further communicate with neutral host 180 that operates base station 200. The communication between master supervisor module 210 and neutral host 180 may take the form of a user interface or similar. Further, master supervisor module 210 may grant neutral host 180 access to system KPI module 235 and the respective shared KPI modules 240/255 of mobile network operator A/B. An example of this may be a situation in which KPI module 125 of mobile network A, using its proprietary KPI data and analytics, may identify an anomaly within a hardware component (e.g., an amplifier) within a given remote unit 170/270 and issue an alarm to neutral host 180 via KPI coordinator 115/215. Depending on how base station 200 is configured, master supervisor module 210 might not have access to the respective KPI processing modules 225/230 of mobile network operator A and B.

Master supervisor module 210 may also have internet connectivity to the mobile network operator or private network A/B's respective core networks 150/160. This may facilitate the communication of configuration information, such as carrier and CBRS channel information, as well as KPI information from KPI coordinator 215. Otherwise, or in addition, KPI modules 225/230 may communicate KPI information directly to their respective mobile network operator core networks 150/160 via their respective DUs 205A/B. The KPI coordinator module 215 and KPI modules 225/230/235/240/245 may be substantially similar to the counterpart KPI modules 115/125/130/135/140/145 described above. It will be understood that such variations are possible and within the scope of the disclosure.

Each of the software-based components within base stations 100/200 may be deployed within their compute environment using container technology, which allows the components to operate independently and enables the instantiation/destruction of components according to commands issued by the master supervisor module 110/210.

Each of the components or modules within base stations 100/200 may comprise machine readable instructions that are encoded within one or more non-transitory memory devices and executed on one or more processors that perform their respective described functions. As used herein, the term "module" may refer to a set of machine readable instructions encoded in a non-transitory memory that may be executed by one or more processors, whereby the machine readable instructions corresponding to the module perform the described function assigned to that module according to the disclosure. Each of the modules may be executed as one or more execution threads, which may be executed by the one or more processors using container technology. As used herein, "non-transitory computer readable memory" may refer to any tangible storage medium (as opposed to an electromagnetic or optical signal) and refers to the medium itself, and not to a limitation on data storage (e.g., RAM (Random Access Memory) vs. ROM (Read Only Memory)). For example, non-transitory medium may refer to an embedded volatile memory encoded with instructions whereby the memory may have to be re-loaded with the appropriate machine-readable instructions after being power cycled.

There are many possibilities for the non-transitory computer readable memory. Some possibilities include an SSD (Solid State Drive), an HD (Hard Disk) drive, a CD (Compact Disc), a DVD (Digital Video Disc), a BD (Blu-ray Disc), a memory stick, or any appropriate combination thereof. In some implementations, the non-transitory computer readable medium is part of the compute environment 101. In other implementations, the non-transitory computer readable medium is separate from the compute environment 101.

Figure 3:
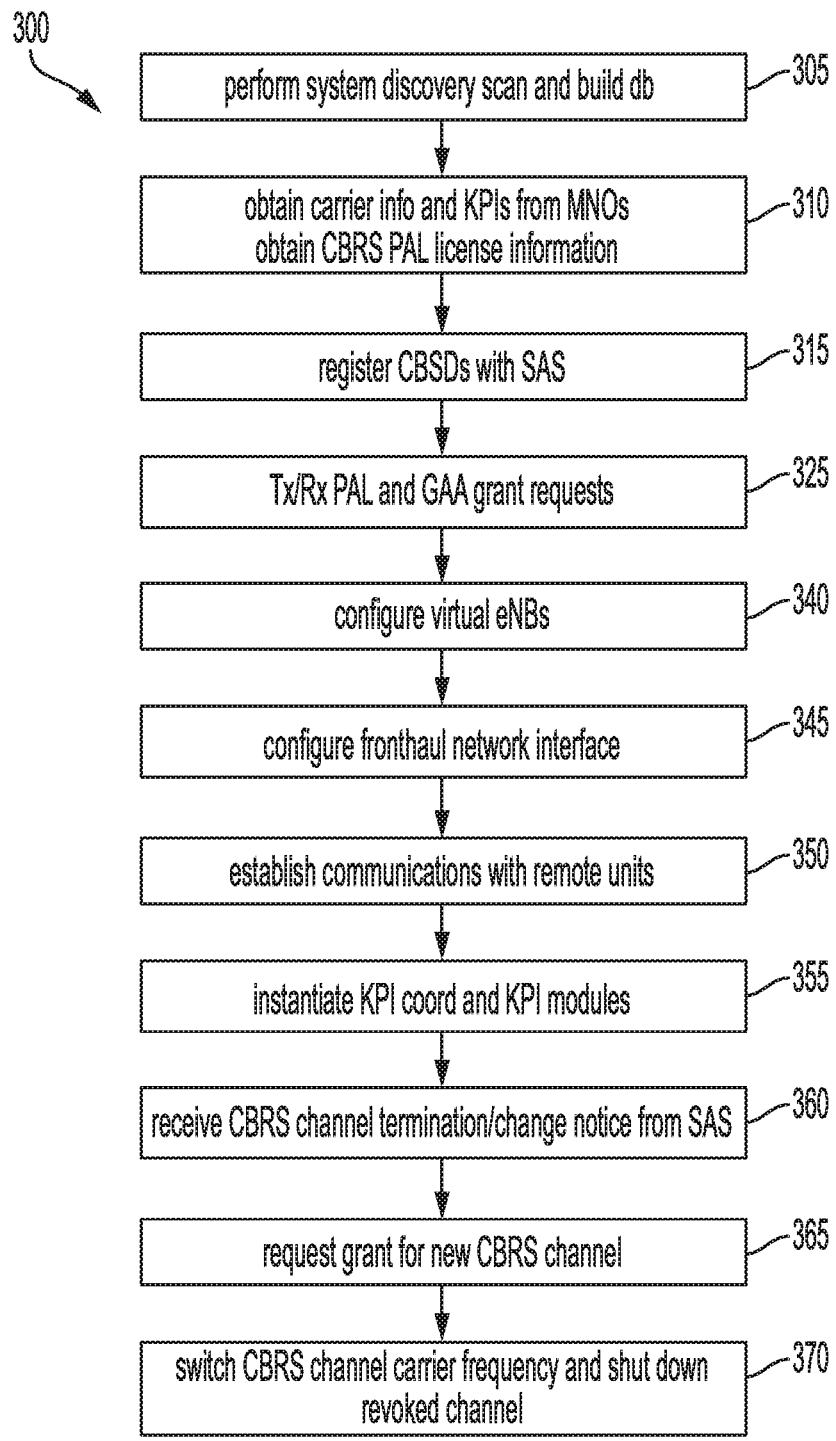
FIG. 3 illustrates an exemplary process for setting up and configuring a base station according to the disclosure.

FIG. 3 illustrates an exemplary process 300 for instantiating and configuring an exemplary base station 100/200 according to the disclosure. Process 300 may be executed by one or more processors (hereinafter "the processor") associated with base station 100/200, stored on non-transitory memory as machine readable instructions, and implemented as functional modules as described above. Although the discussion below may occasionally reference components within base station 100, it will be understood that it may also apply to base station 200. Further, it will be understood that the discussion regarding process 300 may apply to any combination of eNodeBs, gNodeBs (CU or CU+DU combination), or DUs within base station 100/200.

In step 305, the processor executes instructions to instantiate master supervisor module 110/210 and perform a system discovery scan. In doing so, the operating system of the processor may employ container technology to instantiate the master supervisor module 110/210 as well as the other modules of base station 100/200. In step 305, the processor executes instructions for the master supervisor module 110/210 to establish communications with each of the remote units 170 via fronthaul interface 120/220, thereby obtaining addresses, channel capability, location, and power information for each remote unit 170/270. This may include establishing communications with each POI (Point of Interface) within the remote units 170/270. Further to step 305, master supervisor module 110/210 may create a database with the information obtained in the system discovery scan.

In step 310, the processor executes instructions for the master supervisor module 110/210 to establish communications with the network operators' core networks 150/160 and neutral host 180, and to obtain mobile network operator configuration data, which may include licensed spectrum carrier parameters and KPI information from each of the mobile network operators via their respective core networks 150/160. In addition, master supervisor module 110/210 may query the mobile network operator for any CBRS PAL (Priority Access License) numbers that the mobile network operator may have. Master supervisor module 110/210 may also establish communications with any private networks that are to be deployed and supported by base station 100/200. This may include master supervisor 110/210 querying one or more private network servers for any CBRS PAL numbers or other network configuration information. Master supervisor module 110/210 may load appropriate obtained data into the database for subsequent use in configuring the eNodeBs/gNodeBs/DUs and KPI coordinator modules, respectively. The master supervisor module 110/210 may allocate channels within the remote units 170/270 (e.g., POIs) corresponding to each of the mobile network operators licensed spectrum channels and load the appropriate information in the database, matching the channels within the remote units 170/270 to each mobile network operator. The master supervisor module 110/210 may further allocate CBRS channels to each of the mobile network operators and private networks and load the appropriate information into the database.

Although the description below cites CBRS, it will be understood that the disclosure may apply to any shared spectrum access system whereby a base station may request access to one or more shared spectrum channels or bands.

Further to step 310, the processor executes instructions to instantiate the baseband processors 105A/B (base station 100) or DUs 205A/B (base station 200), local supervisor modules 112A/B, and CBRS-Daemons 114A/B. This may be done using container technology. It may do so such that each mobile network operator and private network has its own baseband processor, local supervisor module, and CBRS-Daemon. Master supervisor module 110/210 may map CPU and bus resources to each baseband processor 105A/B according to their individual capacity requirements.

Further to step 310, the processor executes instructions for the supervisor 110 to allocate CBRS channels to each of the baseband processors 105A/B. It may do so according to a prearranged priority by which a given network operator A/B may pay for a given number of CBRS channels, which may be in addition to any CBRS channels to which it might have a PAL number. For example, as illustrated in FIG. 5B, supervisor 110 may allocate CBRS channels 1-3 to baseband processor 105A, and CBRS channels 4-6 to baseband processor 105B.

In step 315, each CBRS-Daemon 114A/B registers its remote units 170/270 with the CBRS SAS (Spectrum Allocation System) 182. In doing so, each CBRS-Daemon 114A/B acts as a domain proxy for its allocated channels within each of the remote units 170/270 to register each as a CBSD. In the example illustrated in FIG. 5B, CBRS-Daemon 114A would register with the SAS 182 regarding CBRS channels 1-3, and CBRS-Daemon 114B would register with the SAS 182 regarding CBRS channels 4-6. This may be done in an array whereby each remote unit 170/270 is an element in the array, and the CBRS-Daemon 114A/B may specify that the CBRS-Daemon 114A/B will take care of intra-group interference coordination. As part of the registration process, if the response from the mobile network operator corresponding to the CBRS-Daemon 114A/B (in step 310) indicates that the mobile network operator or private network has PAL authorization, then the CBRS-Daemon 114A/B indicates as such in the registration process so that each CBSD is registered as within the PPA (PAL Protection Area) and thus authorized to access a PAL-reserved CBRS channel.

In step 325, the processor executes instructions for the CBRS-Daemon 114A/B, acting as a proxy for its CBSDs, to transmit a grant request to the SAS. This grant request may be in the form of an array, for a group request, with each individual CBSD request within the array specifically requesting the CBRS channels allocated to it by the master supervisor module 110/210 in step 310. Depending on the number of mobile network operators and private networks, and the available compute resources in the compute environment of base station 100/200, master supervisor module 110/210 may restrict the number of CBRS channels to which the given CBRS-Daemon 114A/B may issue a grant request, which may be a subset of its CBRS channel allocation. The remaining subset of CBRS channels may be kept in reserve for the given baseband processor in the event of a CBRS channel grant revocation. Each grant request in the array may correspond to a particular CBSD, and for each channel requested for each CBSD, include which channels are being requested under PAL authorization and which channels are being requested under GAA authorization. Each grant request in the array may include a frequency range and a corresponding desired EIRP (Effective Isotropic Radiated Power) for each frequency range.

Further to step 325, each CBRS-Daemon 114A/B receives the license grants from the SAS. The license grant may include, for each CBSD, grants to PAL-reserved channels as well as channels granted under General Authorized Access (GAA). Each channel grant may include a maximum EIRP. It is understood that there is no guarantee that the SAS will grant access to each requested CBRS channel. The SAS may deny access to a given channel and may recommend an alternate channel Each CBRS-Daemon 114A/B may locally store information corresponding to CBRS grants and associated parameters for configuring its corresponding baseband processor 105A/B.

In step 340, the processor may execute instructions for each local supervisor module 112A/B to configure its corresponding baseband processor 105A/B. In doing so, each local supervisor module 112A/B may query the database for all of the information pertaining to its corresponding mobile network operator or private network: e.g., licensed spectrum carriers; allocated CBRS channels, regardless of whether access was granted to a given CBRS channel in step 325;

CBRS channels for which access was granted in step 325 along with their associated parameters; addresses for POIs or remote unit channels; and any other relevant information obtained in step 310. Given the need to maintain security and sequester the resources of each mobile network operator and private network from the others, the master supervisor module 110/210 may create a copy of the database for each local supervisor 112A/B wherein the copy contains only the information pertaining to that particular mobile network operator or private network. Each local supervisor 112A/B configures its corresponding baseband processor 105A/B by provisioning cells for each licensed spectrum carrier and each allocated CBRS channel. In doing so, each local supervisor 112A/B may assign each allocated CBRS channel to a given band-specific cell processor 420/425/420. Local supervisor module 112A/B may activate cells corresponding to CBRS channels for which access was granted in step 325. Any cells corresponding to allocated CBRS channels for which access was denied in step 325 are kept by local supervisor module 112A/B in a deactivated or locked state. Further, in the case in which the master supervisor module 110/210 configured the CBRS-Daemon 114A/B to only request grants for a subset of its allocated CBRS channels (active subset), the local supervisor module 112A/B may configure any cells corresponding to the remaining CBRS channels (inactive subset) to be in a locked or deactivated state. A locked cell (i.e., a cell in a locked state) may be an instantiation of a protocol stack implementation for a band-specific cell processor (described further below) in which there is no connection to fronthaul interface 120/220 and therefore no connected UEs.

Creating a locked cell may be done as follows. Local supervisor module 112 may execute instructions to instantiate a cell within a given baseband processor 105. Local supervisor 112 may preconfigure the locked cell for a given CBRS channel but not assign it a slot within fronthaul interface 120/220. In this case, the processor running the given baseband processor 105/205 may be consuming a nominal amount of resources in executing the instructions to run the locked cell with no connected UEs and no resources assigned to the fronthaul interface 110/210. Either a given baseband processor 105/205— or system 100/200 overall— may maintain a plurality of locked cells, each preconfigured in a locked or "parked" state at a given CBRS channel in case the SAS 182 grants access to the channel. For example, many baseband processors 105/205 may each maintain a locked cell for the same CBRS channel, and only one or more given baseband processors 105/205 may be selected by the master supervisor module 110/210 to have an active cell in the CBRS channel. In the case of multiple baseband processors 105/205 sharing a given CBRS channel, master supervisor module 110/210 may coordinate with the corresponding local supervisor modules 112 to allocate unique component carriers within the CBRS channel. In allocating component carriers, local supervisor modules 112 may instantiate one or more band-specific cell processors, one per component carrier.

In the variation in which fronthaul connection 175 is implemented via Ethernet and fronthaul interface 120 is a router, for a given locked cell, the corresponding baseband processor may be deprived of a connection to the router.

If the given baseband processor 105/205 is granted access to the preconfigured CBRS channel, then local supervisor module 112 may execute instructions to assign appropriate slots in the fronthaul interface 120/220 to the corresponding band-specific cell processor and issue instructions to it to connect to UEs, as is described below regarding the subsequent steps 345 and 350. This approach may be necessary if the underlying software of a virtual baseband processor 105/205 does not facilitate channel reconfiguration on the fly as CBRS grants change. It will be understood that such variations are possible and within the scope of the disclosure.

Figure 4:
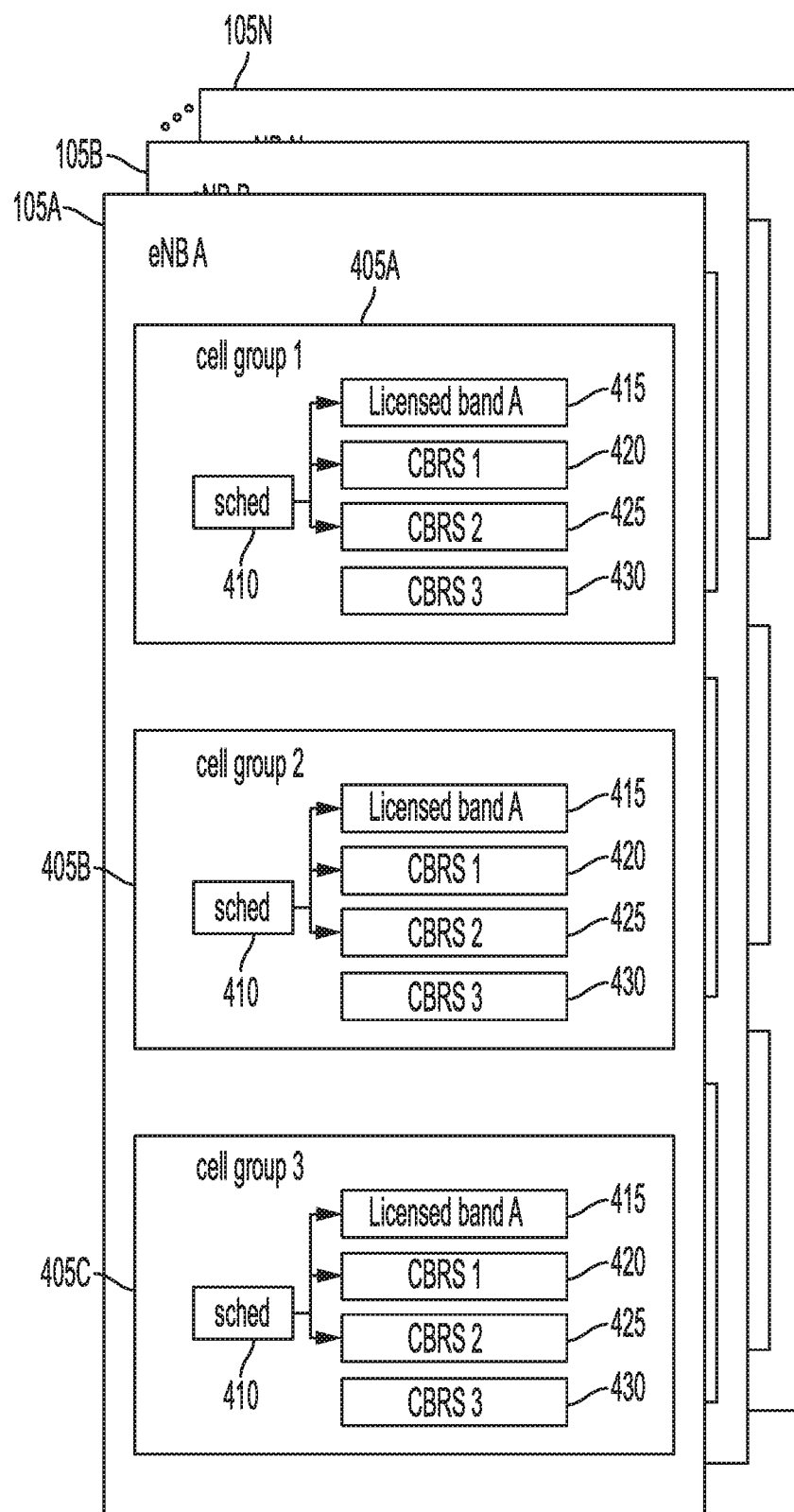
FIG. 4 illustrates a plurality of instantiated and configured virtual baseband processors, each with a plurality of cell groups and constituent active and inactive cells.

FIG. 4 illustrates a plurality of instantiated and configured baseband processors (here illustrated as 105A, B . . . N). In this example, baseband processor 105A has three cell groups 405A-C, each of which may correspond to a remote unit 170/270. Instantiated within cell group 405A-C is a set of one or more band-specific cell processors 415/420/425/430 each of which includes a protocol stack implementation that processes one or more component carriers of its assigned band. In the illustrated example, band-specific cell processor 415 is assigned to the mobile network operator's licensed bands 415; band-specific cell processor 420 is assigned to CBRS channel 1; band-specific cell processor 425 is assigned to CBRS channel 2; and band-specific cell processor 430 is assigned to CBRS channel 3. Each of these band-specific cell processors 415/420/425/430 may be executed by a software-based protocol stack implementation, embodied in a set of machine-readable instructions encoded in a non-transitory memory. Each cell group 415A-C may have a scheduler component 410, which performs MAC-layer scheduling and carrier aggregation between each component carrier set within the given cell group.

Each of the cell groups 405A-C may be referred to as a cell group processor. A cell group processor may be defined as a set of band-specific cell processors capable of serving a given UE or set of UEs within a single coverage area. The use of multiple band-specific cell processors may enable Carrier Aggregation across multiple bands within the cell group processor. Further, in the case of a shared spectrum access system, like CBRS, having multiple CBRS channels (one per band-specific cell processor) may provide redundancy in the event of grant revocation by having one band-specific cell processor parked in an inactive or locked state and assigned to a currently unused CBRS channel. Each band-specific cell processor may be a software-implemented LTE or 5G NR protocol stack, which operates on one or more component carriers within its assigned band or CBRS channel Each protocol stack may include its own scheduler (e.g., MAC layer), with which local scheduler 410 may coordinate for implementing Carrier Aggregation, etc.

In the example illustrated in FIG. 4, the SAS 182 (not shown) has granted access to CBRS channels 1 and 2 to each CBSD in step 325, in response to a proxy grant request issued by CBRS-Daemon 114A. Each CBSD may map to a given remote unit 170/270. The local supervisor 112 has configured band-specific cell processors 420 and 425 to CBRS channels 1 and 2, respectively, and configured band-specific cell processor 430 (assigned to CBRS channel 3) to be kept in a locked state.

It will be understood that the example illustrated in FIG. 4 involves a baseband processor 105A corresponding to a network operator. If baseband processor 105A were assigned to a private network, band-specific cell processor 415 may be omitted and baseband processor 105A may be operating solely on shared spectrum access (e.g., CBRS) channels. It will be understood that such variations are possible and within the scope of the disclosure.

Returning to process 300 in FIG. 3, in step 345, the processor executes instructions to set up fronthaul network interface 120/220, which may include instantiating any software modules that configure and operate the fronthaul interface (such as a mapping module 185), perform any necessary data conversion, and serve as a router between each of the baseband processors 105A/B or DUs 205A/B and the hardware of the fronthaul network interface 120/220, as described above. This may include setting up ports for DMA buffers 192 to be allocated to each baseband processor 105A/B or DU 205A/B. Alternatively, if the fronthaul network interface 120/220 is an Ethernet interface that supports packet-based communication between the baseband processors 105A/B or DUs 205A/B then the fronthaul network interface 120/220 may be configured as a packet switched network fabric between the baseband processors 105A/B or DUs 205A/B and the remote units 170/270.

In step 350, the processor executes instructions to establish communication between the base station 100/200 and the remote units 170/270 to configure the remote units 170/270 for selecting bands and power levels for the carriers to be used by mobile network operators A and B and any private networks.

In step 355, the processor executes instructions to instantiate the KPI coordinator 115/215 and the KPI modules 125/225, 130/230, 135/235, 140/240, and 145/245 and establish communications channels between the designated KPI modules and their respective baseband processors 105A/B or DUs 205A/B.

With all of the software modules instantiated, the processor may execute instructions for the master supervisor module 110/210 to establish inter-task communications between the software modules as illustrated in FIGS. 1 and 2.

At this stage in process 300, base station 100/200 may begin operating as intended, with each mobile network operator and private network functioning independently with separate resources within a shared computing environment, fronthaul, and topology of remote units 170/270. The remaining discussion of process 300 involves an example scenario in which the SAS revokes a grant to use one or more CBRS channels and/or recommends switching to a new CBRS channel, which may happen at any time during the course of operations.

During operation, each CBRS-Daemon 114A/B may issue heartbeat requests to the SAS 182 on behalf of, and as a proxy for, its CBSDs (its channels within remote units 170/270) and receive heartbeat responses from the SAS 182 accordingly.

In step 360, a CBRS-Daemon 114A/B may receive indication from the SAS 182 that the grant for a given CBRS channel to a given CBSD is revoked. This may be done through the CBRS heartbeat response according to known procedures.

In step 365, in the event of a grant revocation, the affected CBRS-Daemon 114A/B may do two things: (1) send a signal to its corresponding local supervisor module 112A/B indicating grant revocation to an allocated CBRS channel; and (2) issue a new grant request to the SAS 182, requesting a grant to one or more of its allocated CBRS channels within its inactive subset of channels. If the SAS 182 grants access to the newly requested CBRS channel, then local supervisor module 112A/B may activate the preexisting locked cell preconfigured for the newly-granted CBRS channel (described below in step 370).

There may be situations in which a given baseband processor 105A/B has a cell that traverses two CBRS channels. For example, referring to FIG. 4, cell group 1 (405A) may have a single cell whose frequencies exist in both CBRS 1 (420) and CBRS 2 (425). In this case, a grant revocation may eliminate access to a portion of the spectrum that the given cell is using. In response to this, the CBRS-Daemon 114A/B, the local supervisor module 112 for cell group 1 405A, the scheduler 410, and the master supervisor module to collectively do any of the following: (1) lock the cell that traverses the two CBRS bands and transmit a grant request for two new allocated CBRS channels that can handle the cell; or (2) restrict the bandwidth of the cell so that it fits within the still-granted CBRS channel, and then transmit a grant request for another allocated CBRS channel that the scheduler 410 may provide Carrier Aggregation between the still-granted CBRS channel and the newly-granted CBRS channel.

In step 370, the local supervisor module 112A/B may transfer or hand off the UEs connected to the CBSD and CBRS channel subject to the grant revocation to other active cells within its cell group (potentially including the newly-activated cells corresponding the newly-granted CBRS channel in step 365), and then lock the band-specific cell processor corresponding to the CBRS channel with the revoked grant.

Handing off or otherwise transferring the UEs connected to the revoked CBRS channel to another cell within the cell group may be done as follows. In one example, the scheduler 410 may issue instructions to handoff the UEs from the cells corresponding to the revoked CBRS channel using conventional methods specified in the 3GPP specification. Alternatively, local supervisor module 112A/B may issue an instruction to master supervisor module 110/210 to issue a command to the appropriate remote unit(s) 170/270 (corresponding to the revoked CBSD(s)) to ramp down the transmit power corresponding to the revoked CBRS channel. In doing so, the UEs connected to the revoked CBSD will autonomously identify an alternate cell within its cell group and connect to the cell with the stronger signal. An advantage to this approach is that it takes advantage of the UE's ability to identify an alternate cell most suited to it and connect without intervention by the scheduler 510. Another advantage of this approach is that CBRS regulations require a prompt shut down of the radio subject to a grant revocation, which is facilitated by this approach.

Further to step 370, the processor may execute instructions for the master supervisor module 110/210 to issue commands to the fronthaul network interface 120/220 (and to the mapping module 185) to connect the newly-activated cells to the remote units 170/270 affected by the CBSD grant revocation, which may include detaching the affected band-specific cell processor corresponding to the revoked CBRS channel from their respective DMA buffers 192 and connecting the newly-activated band-specific cell processors to the corresponding DMA buffers 192; issuing commands to the affected remote units 170/270 to begin transmitting and receiving at the new CBRS channel and stop transmitting at the revoked channel at the initiation of an identified start frame; issuing commands to the daisy chained affected remote units 170/270 to sum the uplink signals at the new CBRS channel; and issuing commands to the remote units 170/270 corresponding to the non-revoked CBSDs to no longer sum the uplink data from the remote units 170/270 affected by the revocation. Further to step 370, master supervisor module 110/210 may issue a notification to the relevant core networks 150/160 that the relevant CU 252 corresponding to the revoked CBRS channel is to switch to the new channel. The band-specific cell processor assigned to the revoked CBRS channel may then run in a locked state, disconnected from any UEs or the fronthaul interface 120/220, consuming nominal processor resources as it idles.

Although the above example describes the use of CBRS, it will be understood that the disclosure would pertain to any dynamic shared spectrum allocation system in which one or more frequency ranges are made locally available to a remote unit or base station on a time-dependent request/ grant basis, in which the channels are otherwise publicly available. As used herein a CBRS channel is an example of a shared spectrum allocation channel. Further, although the example discloses a CBRS-Daemon, it will be understood that the disclosure would pertain to any dynamic shared spectrum domain proxy that obtains grants and revocations from the dynamic shared spectrum allocation system on behalf of one or more remote units.

Figure 5A:
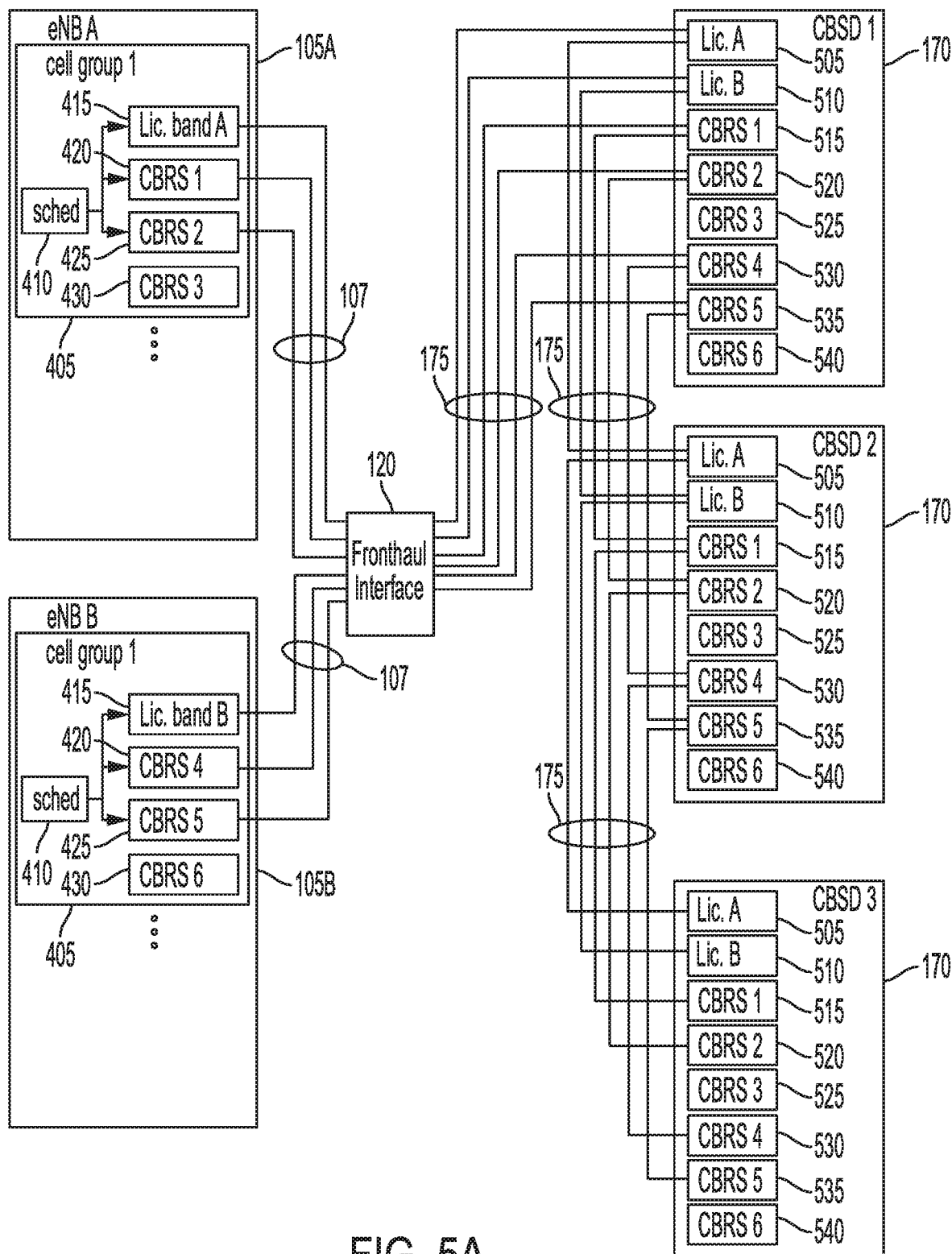
FIG. 5A illustrates an exemplary deployment of virtual baseband processors, in which each has a cell group that is connected to a plurality of remote units in a multicast daisy chain fashion.
Figure 5B:
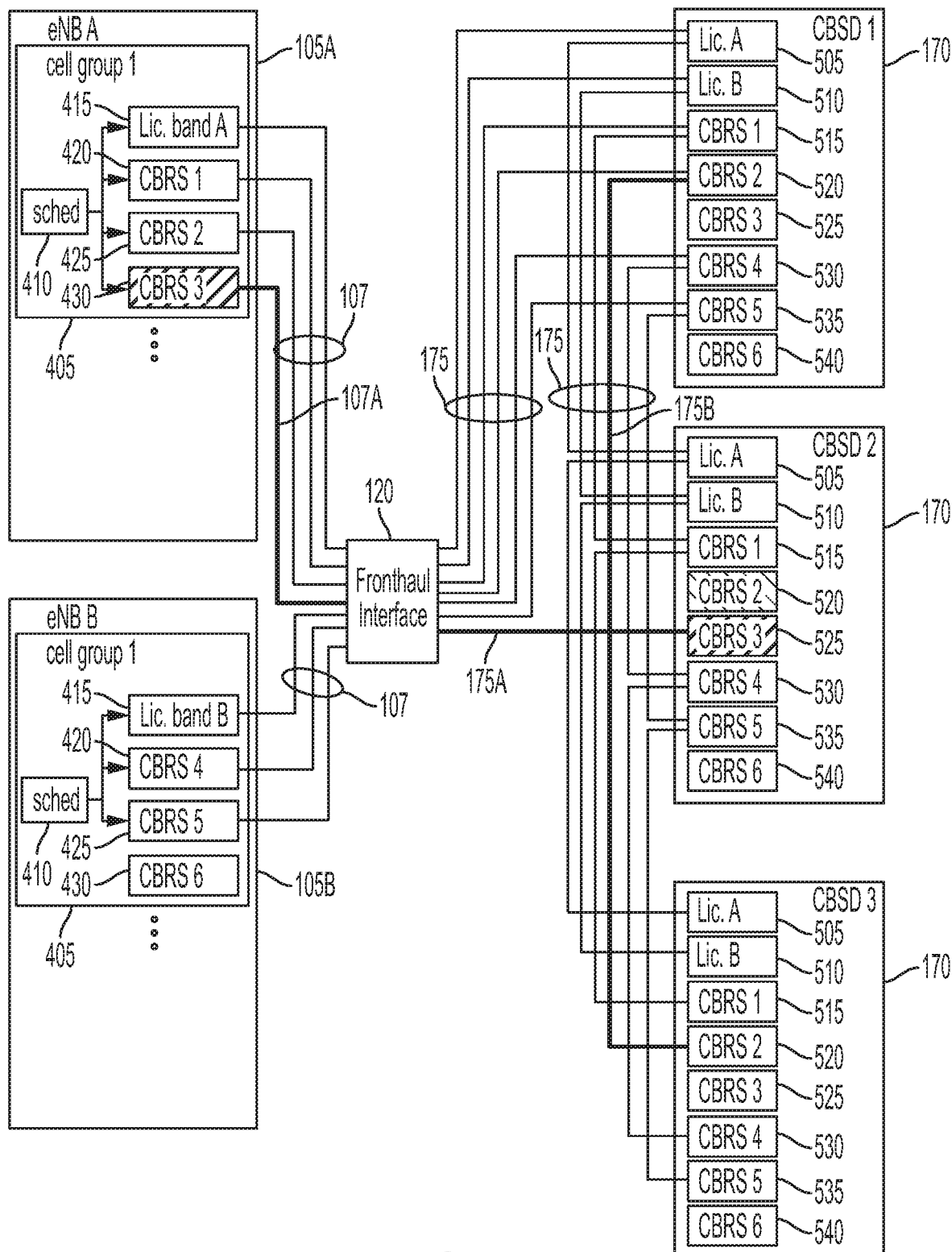
FIG. 5B illustrates the exemplary deployment of FIG. 5A, after access to one of CBRS (Citizens Broadband Radio Service) channels in one CBSD (Citizens Broadband radio Service Device) has been revoked.

FIG. 5A illustrates an exemplary deployment of base station 100/200, including baseband processors 105A/B, each similar to that illustrated in FIG. 4. In this example, each of the baseband processors 105A/B have at least one cell group 405 configured for multicast operation. Each set of band-specific cell processors for licensed bands and CBRS channels (415/420/425, in this example) is coupled to fronthaul network interface 120 via bidirectional digital baseband I/Q data connection 107. As illustrated, baseband processor 105A has a locked band-specific cell processor 430 for CBRS 3, and baseband processor 105B has a locked band-specific cell processor 430 for CBRS 6. Each CBSD/ remote unit 170 has an RF processing block for mobile network operator A's licensed band (505); an RF processing block for mobile network operator B's licensed band (510); an RF processing block for CBRS channel 1, allocated to mobile network operator A (515); an RF processing block for CBRS channel 2, allocated to mobile network operator A (520); an RF processing block for CBRS channel 3, which is inactive (525); an RF processing block for CBRS channel 4, allocated to mobile network operator B (530); an RF processing block for CBRS channel 5, allocated to mobile network operator B (535); and an RF processing block for CBRS channel 6, which is inactive (540). Each may include lower layer LTE or 5G protocol stack processing, such as PHY layer processing.

For the example illustrated in FIG. 5A, the term CBSD and remote unit may be used interchangeably. Further, although the example uses LTE terminology and the reference numbers of base station 100, it will be understood that this example may apply equally to 5G base station 200.

In the example illustrated in FIG. 5A, each of the individual RF processing blocks 505/510/515/520/530/535 excluding RF processing blocks 525/540 are daisy chained and coupled to the corresponding set of component carriers within cell group 405 of either baseband processor 105A or baseband processor 105B. This enables multicast operation in which multiple remote CBSDs 170 may share a cell. In this example, all of the UEs connected collectively to the remote CBSDs 170 at a given component carrier may share a single data frame. For the downlink (DL), a given baseband processor 105A/B may use a single component carrier processing thread (and thus a single data frame) for all of the daisy chained CBSDs, and thus a copy of a single data frame may be copied and transmitted to all of the CBSDs 170. For the uplink (UL), however, a given RF processing block within a single CBSD 170 (for example, CBRS 4 (530)) may receive signals only from the UEs connected to that CBSD 170 at that frequency. The other CBSDs 170 will each receive signals from a unique set of UEs, allocated to a distinct set of REs within that component carrier's data frame. Given this, each CBSD 170 sums the signal it receives from its own antennas with the data it receives from the downstream neighbor CBSD 170.

As described above, a daisy chain topology of remote units 170 enables both multicasting of DL and summing of UL component carriers. In this case, CBSD 2 may sum the band-specific UL signals received from its connected UEs with the corresponding band-specific signal data received from CBSD 3; and CBSD 1 may sum the UL signals its connected UEs with the corresponding band-specific signal data from CBSD 2.

Further to the example illustrated in FIG. 5A, both baseband processors 105A/B have a cell group processor 405 that is configured for multicast operation. However, each baseband processor 105A/B may have other operating cell group processors, as illustrated in FIG. 4, which may be configured for multicast operation with other remote units (not shown) or in a mode whereby each cell group is coupled to one more remote units in a non-multicast function. It will be understood that such variations are possible and within the scope of the disclosure.

Further to the example of FIG. 5A, fronthaul interface 120 and fronthaul link 175 may involve a CPRI link. In this case, each RF processing block includes circuitry for receiving a CPRI stream from a downstream remote unit 170, extracting the CPRI stream data corresponding to the given band for that RF processing block, summing the extracted CPRI stream data with the data generated by the RF processing block from signals received by its antennas (from its connected UEs), inserting the summed data into the corresponding CPRI block, and transmitting the new CPRI data upstream to the next remote unit 170 or fronthaul interface 120. As mentioned above, the summation may be over a single TTI (transmit time interval). In a variation in which fronthaul link 175 is an Ethernet connection, then fronthaul interface 120 may be a router by which each baseband processor 105A/B may communicate with various remote units 170 using packetized data streams. In this example, uplink summing may be done at fronthaul interface 120 or at the appropriate baseband processor 105A/B.

FIG. 5B illustrates the system of FIG. 5A after grant revocation of a single CBRS channel for a single CBSD 170. In this example, baseband processor 105A initially has active band-specific cell processors for its licensed band 415, CBRS 1 (420), and CBRS 2 (425). At the point of grant revocation, referring to step 360 of process 300, baseband processor 105A's CBRS-Daemon (not shown) receives a grant revocation from the SAS, revoking access to CBRS channel 2 in CBSD 2. As specified in step 365, the CBRS-Daemon may transmit a grant request to the SAS requesting a grant to CBRS 3, which is assigned a preconfigured and locked band-specific cell processor 430 within baseband processor 105A. If the SAS grants access to CBRS 3, then the CBRS-Daemon may issue commands to baseband processor 105A's local supervisor module (not shown) the CBRS 2 RF processing block 520 in CBSD 2 will have to be shut down, and the UEs connected to it will have to be handed over to other channels, in accordance with step 370. In response, the local supervisor module for baseband processor 105A may unlock and activate the band-specific cell processor 430 corresponding to CBRS 3; handover the affected UEs to other channels (e.g., by ramping down the power of RF processing block 520 of CBSD 2 to trigger the UEs to establish connection with other channels within CBSD 2), and lock the CBRS 2 band-specific cell processor 425. Further to this, the master coordinator module (not shown) may issue instructions to fronthaul interface module 120 to allocate a CPRI slot (and thus a DMA buffer) to baseband processor 105A's CBRS 3 band-specific cell processor 425; issue instructions to CBSD 1 and CBSD 3 to remove CBSD 2 from the daisy chain configuration for CBRS 2; issue instructions for CBSD 2 to activate RF processing block 525 for CBRS 3, which includes information on the newly-allocated CPRI slot for the band-specific cell processor 430 of CBRS 3 for baseband processor 105A; and issue instructions to CBSD 2 to shut down the RF processing block 520 for CBRS 2. The new I/Q data connection for baseband processor 105A's CBRS 3 band-specific cell processor 430 is shown as data connection 107A (darker line in FIG. 5B); the new fronthaul link between fronthaul interface 120 and CBSD 2 for CBRS 3 is shown as fronthaul link 175A (darker line in FIG. 5B); and the new link between CBSD 1 and CBSD 3 for CBRS 2 is shown as data connection 175B (darker line in FIG. 5B).

Unless expressly defined otherwise, the term "subset" may mean some or all of the elements of its corresponding set. Further, as used herein, a channel denial may include a grant revocation (for a previously granted channel) and a denial (for a channel in which no grant had been given).

What is claimed is:

1. A server, comprising:
   at least one network interface configured to communicate with a core network and a plurality of remote units;
   at least one processor; and
   a non-transitory computer readable memory encoded with instructions which, when executed by the at least one processor, cause the at least one processor to implement a process comprising:
   performing baseband processing, using a first band-specific cell processor, on a communication received, via the at least one network interface, from the core network, and routed to the plurality of remote units over a first shared spectrum access channel;
   receiving, via the at least one network interface, a message revoking a grant to the first shared spectrum access channel;
   transmitting, via the at least one network interface, a request for a grant to use a second shared spectrum access channel;
   receiving, via the at least one network interface, a message granting access to the second shared spectrum access channel;
   unlocking a second band-specific cell processor corresponding to the second shared spectrum access channel;
   reconfiguring, via the at least one network interface, the plurality of remote units to cease transmitting and receiving on a first radio frequency band corresponding to the first shared spectrum access channel and to begin transmitting and receiving on a second radio frequency band corresponding to the second shared spectrum access channel; and
   locking the first band-specific cell processor.

2. The server of claim 1, wherein the at least one network interface comprises:
   a backhaul network interface coupled between the first and second band-specific cell processors and the core network; and
   a fronthaul network interface coupled between the first and second band-specific cell processors and the plurality of remote units.

3. The server of claim 2, wherein the backhaul interface comprises an Ethernet interface.

4. The server of claim 2, wherein the fronthaul interface comprises an Ethernet interface.

5. The server of claim 2, wherein the fronthaul interface comprises an eCPRI interface.

6. The server of claim 1, wherein the reconfiguring, via the at least one network interface, of the plurality of remote units to cease transmitting and receiving on a first radio frequency band corresponding to the first shared spectrum access channel and begin transmitting and receiving on a second radio frequency band corresponding to the second shared spectrum access channel comprises:
   transmitting a power up command to each of the plurality of remote units to power up a second radio within each of the plurality of remote units, the second radio corresponding to the second shared spectrum access channel; and
   transmitting a power down command to each of the plurality of remote units to ramp down a transmit power of a first radio within each of the plurality of remote units, the first radio corresponding to the first shared spectrum access channel.

7. The server of claim 1, wherein the first shared spectrum access channel comprises a first CBRS (Citizens Broadband Radio Service) channel, and the second shared spectrum access channel comprises a second CBRS channel.

8. A method for operating a wireless network, comprising:
   instantiating a virtual baseband processor, the virtual baseband processor having a plurality of cell group processors, each of the plurality of cell group processors having a first band-specific cell processor and a second band-specific cell processor;
   configuring the first band-specific cell processor of each of the plurality of cell group processors to operate on a first shared spectrum access channel;
   configuring the second band-specific cell processor of each of the plurality of cell group processors to operate on a second shared spectrum access channel;
   requesting a grant to the first shared spectrum access channel for the first band-specific cell processor of each of the plurality of cell group processors;
   receiving the grant to the first shared spectrum access channel for each the first band-specific cell processor of each of the plurality of cell group processors;
   setting the first band-specific cell processor within each of the plurality of cell group processors in an unlocked state; and
   setting the second band-specific cell processor of each of the plurality cell group processors in a locked state.

9. The method of claim 8, further comprising:
   receiving a grant revocation to the first shared spectrum access channel corresponding to a first cell group processor within the plurality of cell group processors;
   requesting a grant to the second shared spectrum access channel for the second band-specific cell processor of the first cell group processor;
   receiving the grant to the second shared spectrum access channel for the second band-specific cell processor of the first cell group processor;
   unlocking the second band-specific cell group processor of the first cell group processor; and
   transmitting a command to one or more remote units coupled to the first cell group processor to cease transmitting and receiving on the first shared spectrum access channel and to begin transmitting and receiving on the second shared spectrum access channel.

10. The method of claim 9, further comprising locking the first band-specific cell processor of the first cell group processor.

11. The method of claim 9, wherein transmitting a command to one or more remote units coupled to the first cell group processor to cease transmitting and receiving on the first shared spectrum access channel and to begin transmitting and receiving on the second shared spectrum access channel comprises:

transmitting a command to each of the one or more remote units coupled to the first cell group processor to switch on a radio corresponding to the second shared spectrum access channel; and transmitting a command to each of the one or more remote units coupled to the first cell group processor to ramp down a transmit power of a radio corresponding to the first shared spectrum access channel.

12. The method of claim 9, further comprising:

disconnecting the first band-specific cell processor of the first cell group processor from a fronthaul network interface; and connecting the second band-specific cell processor of the first cell group processor to the fronthaul network interface.

13. The method of claim 8, wherein the first shared spectrum access channel comprises a first CBRS channel, and wherein the second shared spectrum access channel comprises a second CBRS, channel.

14. The method of claim 13, wherein the requesting a grant to the first shared spectrum access channel for the first band-specific cell processor of each of the plurality of cell group processors comprises requesting access from a CBRS Spectrum Allocation System (SAS).

15. A non-transitory computer readable medium encoded with instructions which, when executed by one or more processors, cause the one or more processors to implement a process for operating a virtual base station, the process comprising:

instantiating a virtual baseband processor, the virtual baseband processor having a plurality of cell group processors, each of the plurality of cell group processors having a first band-specific cell processor and a second band-specific cell processor;

configuring the first band-specific cell processor of each of the plurality of cell group processors to operate on a first shared spectrum access channel;

configuring the second band-specific cell processor of each of the plurality of cell group processors to operate on a second shared spectrum access channel;

requesting a grant to the first shared spectrum access channel for the first band-specific cell processor of each of the plurality of cell group processors;

receiving the grant to the first shared spectrum access channel for each the first band-specific cell processor of each of the plurality of cell group processors;

setting the first band-specific cell processor within each of the plurality of cell group processors in an unlocked state; and setting the second band-specific cell processor of each of the plurality cell group processors in a locked state.

16. The non-transitory computer readable medium of claim 15, whereby the process further comprises:

receiving a grant revocation to the first shared spectrum access channel corresponding to a first cell group processor within the plurality of cell group processors;

requesting a grant to the second shared spectrum access channel for the second band-specific cell processor of the first cell group processor;

receiving the grant to the second shared spectrum access channel for the second band-specific cell processor of the first cell group processor;

unlocking the second band-specific cell group processor of the first cell group processor; and transmitting a command to one or more remote units coupled to the first cell group processor to cease transmitting and receiving on the first shared spectrum access channel and to begin transmitting and receiving on the second shared spectrum access channel.

17. The non-transitory computer readable medium of claim 16, whereby the process further comprises locking the first band-specific cell processor of the first cell group processor.

18. The non-transitory computer readable medium of claim 17, wherein the transmitting a command to one or more remote units coupled to the first cell group processor to cease transmitting and receiving on the first shared spectrum access channel and to begin transmitting and receiving on the second shared spectrum access channel comprises:

transmitting a command to each of the one or more remote units coupled to the first cell group processor to switch on a radio corresponding to the second shared spectrum access channel; and transmitting a command to each of the one or more remote units coupled to the first cell group processor to ramp down a transmit power of a radio corresponding to the first shared spectrum access channel.

\* \* \* \* \*